United States Patent
Pi et al.

(10) Patent No.: US 11,347,771 B2
(45) Date of Patent: May 31, 2022

(54) CONTENT ENGINE ASYNCHRONOUS UPGRADE FRAMEWORK

(75) Inventors: Wan-Chang Pi, San Gabriel, CA (US); Michael Roy Clive Seaman, Impington (GB); Shawn Michael Waters, Bothell, WA (US)

(73) Assignee: International Business Machines Corporation, Armonk, NY (US)

( * ) Notice: Subject to any disclaimer, the term of this patent is extended or adjusted under 35 U.S.C. 154(b) by 1504 days.

(21) Appl. No.: 11/946,683

(22) Filed: Nov. 28, 2007

(65) Prior Publication Data

US 2009/0138523 A1 May 28, 2009

(51) Int. Cl.
  *G06F 16/27* (2019.01)
  *G06F 16/23* (2019.01)

(52) U.S. Cl.
  CPC .......... *G06F 16/273* (2019.01); *G06F 16/235* (2019.01); *G06F 16/2315* (2019.01); *G06F 16/2379* (2019.01)

(58) Field of Classification Search
  CPC ......... G06F 17/30365; G06F 17/30348; G06F 17/30345; G06F 17/30377; G06F 16/235; G06F 16/2315; G06F 16/25; G06F 16/2379; G06F 16/273
  USPC ....................................................... 707/609
  See application file for complete search history.

(56) References Cited

U.S. PATENT DOCUMENTS

| | | | | |
|---|---|---|---|---|
| 5,191,652 A | * | 3/1993 | Dias et al. | 709/251 |
| 5,781,912 A | * | 7/1998 | Demers | G06F 11/1474 707/634 |
| 5,995,980 A | * | 11/1999 | Olson et al. | 707/999.201 |
| 6,098,078 A | * | 8/2000 | Gehani et al. | 707/610 |
| 6,360,363 B1 | | 3/2002 | Moser et al. | |
| 6,487,561 B1 | * | 11/2002 | Ofek et al. | |
| 6,681,228 B2 | * | 1/2004 | Balogh | 707/770 |
| 7,000,229 B2 | | 2/2006 | Gere | |
| 7,031,974 B1 | * | 4/2006 | Subramaniam | |
| 2001/0001870 A1 | * | 5/2001 | Ofek et al. | 711/112 |
| 2001/0049263 A1 | * | 12/2001 | Zhang | 455/67.1 |
| 2002/0002557 A1 | * | 1/2002 | Straube et al. | 707/103 Z |
| 2002/0091719 A1 | * | 7/2002 | Cole | 707/202 |
| 2002/0152188 A1 | * | 10/2002 | Crus et al. | 707/1 |
| 2002/0156786 A1 | * | 10/2002 | Martin et al. | 707/10 |

(Continued)

OTHER PUBLICATIONS

Moser et al. "The Eternal System: An Architecture for Enterprise Applications", Enterprise Distributed Object Computing Conference, 1999, EDOC apos;99, Proceedings, Third International vol. pp. 214-222.

(Continued)

*Primary Examiner* — Kannan Shanmugasundaram
(74) *Attorney, Agent, or Firm* — Patterson + Sheridan, LLP (57) ABSTRACT

Embodiments of the invention provide a tool for performing asynchronous upgrades of data stored in computer databases. In one embodiment, an upgrade tool may be configured to split existing data records into data blocks. Each data block may be queued in an asynchronous queue. When processing capacity is available, the data block may undergo an upgrade operation, and another data block may be added to the queue. Once all data blocks are upgraded, the upgraded data records may be used by applications accessing the database. In one embodiment, different types of upgrade operations may be performed on the data records.

21 Claims, 6 Drawing Sheets

(56) References Cited

U.S. PATENT DOCUMENTS

| | | | |
|---|---|---|---|
| 2002/0174296 A1* | 11/2002 | Ulrich et al. | 711/114 |
| 2002/0188625 A1* | 12/2002 | Jans et al. | 707/203 |
| 2003/0009753 A1* | 1/2003 | Brodersen et al. | 717/172 |
| 2003/0033386 A1* | 2/2003 | Dahlen et al. | 709/220 |
| 2003/0084038 A1* | 5/2003 | Balogh | G06F 9/505 707/999.003 |
| 2003/0120688 A1* | 6/2003 | Hill et al. | 707/203 |
| 2003/0130985 A1* | 7/2003 | Driesen et al. | 707/1 |
| 2003/0135518 A1* | 7/2003 | Anglin et al. | 707/104.1 |
| 2003/0191795 A1* | 10/2003 | Bernardin et al. | 709/105 |
| 2004/0162811 A1* | 8/2004 | Wetzer et al. | 707/2 |
| 2005/0193041 A1* | 9/2005 | Bourbonnais et al. | 707/204 |
| 2005/0198630 A1* | 9/2005 | Tamma et al. | 717/175 |
| 2006/0047717 A1* | 3/2006 | Pereira | 707/204 |
| 2006/0190501 A1* | 8/2006 | Massironi | 707/203 |
| 2006/0195436 A1* | 8/2006 | Levesque et al. | 707/4 |
| 2006/0206537 A1* | 9/2006 | Chiang | 707/200 |
| 2007/0038590 A1* | 2/2007 | Vijayan et al. | 707/1 |
| 2007/0239794 A1* | 10/2007 | Metzner | 707/200 |
| 2007/0261049 A1* | 11/2007 | Bankston et al. | 717/170 |
| 2007/0288537 A1* | 12/2007 | Bourbonnais et al. | 707/204 |
| 2008/0098037 A1* | 4/2008 | Neil et al. | 707/200 |
| 2008/0098046 A1* | 4/2008 | Alpern | G06F 17/30306 707/999.203 |
| 2008/0126333 A1* | 5/2008 | Bezar et al. | 707/5 |
| 2009/0019094 A1* | 1/2009 | Lashley et al. | 707/203 |

OTHER PUBLICATIONS

Patel et al. "Upgrading Transport Protocols using Untrusted Mobile Code", SOSP'03, Oct. 19-22, 2003, Bolton Landing, New York, USA, © 2003 ACM Symposium on Operating Systems Principles, pp. 1-14.

Brecht et al. "Evaluating Network Processing Efficiency with Processor Partitioning and Asynchronous I/O" EuroSys'06, Apr. 18-21, 2006, Leuven, Belgium, © 2006 ACM, pp. 265-278.

Liu et al. "Multiview Access Protocols for Large-Scale Replication" ACM Transactions on Database Systems, vol. 23, No. 2, Jun. 1998, pp. 158-198.

\* cited by examiner

CONTENT ENGINE ASYNCHRONOUS UPGRADE FRAMEWORK

BACKGROUND OF THE INVENTION

Field of the Invention

Embodiments of the invention are related to computer databases. More specifically, embodiments of the invention provide a tool for upgrading data records accessed in a database.

Description of the Related Art

Databases are well known systems for storing, searching, and retrieving information stored in a computer. The most prevalent type of database used today is the relational database, which stores data using a set of tables that may be reorganized and accessed in a number of different ways. Users access information in relational databases using a relational database management system (DBMS). Each table in a relational database includes a set of one or more columns. Each column typically specifies a name and a data type (e.g., integer, float, string, etc.), and may be used to store a common element of data.

Over time, application developers release new versions of existing software applications, e.g., a new version of a database, a word processor, an application server, etc. When a new software version is installed, users may need to upgrade data records created using prior versions of the software. For example, in the context of content management, a conventional upgrade tool may be configured to perform tasks such as upgrading database metadata regarding a relatively small number of database objects. However, conventional upgrade tools are not able to upgrade large numbers of documents without taking the overall system offline for a lengthy period of time. This may not be an acceptable solution for many customers however, as taking the content management tools offline for a lengthy period of may simply be too disruptive of ongoing business operations. For this reason, upgrades may not be performed for objects with a large number of instances (such as documents). Thus, old data may be left unchanged in the database, while new records are created according to the new version of software.

Depending on the functionality introduced in a new software version, a new implementation may have to convert/upgrade old data on-the-fly, which slows down performance, or ignore it, which costs extra storage. Alternatively, users may have to simultaneously use both a new version and an old version of a software application, depending on which data records are going to be accessed. The coexistence of old data and new data in the database may also cause data discrepancies and lead to incorrect query results.

SUMMARY OF THE INVENTION

Embodiments of the invention provide an asynchronous upgrade tool for upgrading data stored in computer databases. One embodiment of the invention includes a method for upgrading a plurality of database records. The method may generally include receiving a selection of an upgrade operation to be performed on the plurality of database records and generating a plurality of data blocks. Each data block may reference a different set of database records, of the plurality of database records, relative to other data blocks. The method may also include, while any data blocks remain in the asynchronous upgrade queue, determining whether resources are available to process a next data block in the upgrade queue. Upon determining resources are available, a data block from the asynchronous upgrade queue is selected and the upgrade operation is performed on the database records referenced in the selected data block. If any data blocks remain in the asynchronous upgrade queue, a next data block to be upgraded is identified.

Another embodiment of the invention includes a computer-useable storage medium containing a program, which, when executed performs an operation for upgrading a plurality of database records. The operation may generally include receiving a selection of an upgrade operation to be performed on the plurality of database records, generating a plurality of data blocks. Each data block may reference a different set of database records, of the plurality of database records, relative to other data blocks. The operation may also include, while any data blocks remain in the asynchronous upgrade queue, determining whether resources are available to process a next data block in the upgrade queue. Upon determining resources are available, a data block from the asynchronous upgrade queue is selected and the upgrade operation is performed on the database records referenced in the selected data block. If any data blocks remain in the asynchronous upgrade queue, a next data block to be upgraded is identified.

Still another embodiment of the invention includes a system having a processor and a memory containing a program, which when executed by the processor, is configured to perform an operation for upgrading a plurality of database records. The program may be generally configured to perform the steps of receiving a selection of an upgrade operation to be performed on the plurality of database records and generating a plurality of data blocks. Each data block may reference a different set of database records, of the plurality of database records, relative to other data blocks. The steps performed by the program may also include, while any data blocks remain in the asynchronous upgrade queue, determining whether resources are available to process a next data block in the upgrade queue. Upon determining resources are available, a data block from the asynchronous upgrade queue is selected and the upgrade operation is performed on the database records referenced in the selected data block. If any data blocks remain in the asynchronous upgrade queue, a next data block to be upgraded is identified.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Embodiments of the invention may be used to upgrade a number of data objects stored by a system (e.g., a relational database), without also having to take the system offline. Generally, data records may be structured according to a particular format required by an application. For example, a database may contain records storing application content used by a content engine (e.g., image files, audio files, and text files, etc.) used to provide content to requesting users. In some situations, a software application (e.g., the content engine used to respond to user requests for information) may be modified so as to require a new data format or simply upgraded to a new version. In such situations, existing data records associated with the application may have to be upgraded to the new data format. For example, if the modified application incorporates a certain type of data encryption, then any existing data records may have to be upgraded to have that type of data encryption. In the case of a database that includes a large number of data records, upgrading the data may impose a large processing workload on the content management system. Thus, the content engine may be unavailable to respond to user requests, such as providing content for a commercial website or providing data records for other software applications which store records in a common database.

Embodiments of the invention provide a tool for performing asynchronous upgrades of data stored in computer databases. In one embodiment, an upgrade tool may be configured to split existing data records into data blocks. Each data block may be queued in an asynchronous queue. When processing capacity is available, the data block may undergo an upgrade operation, and another data block may be added to the queue. Once all data blocks are upgraded, the upgraded data records may be used by applications accessing the database. In one embodiment, different types of upgrade operations may be performed on the data records. By enabling the use of asynchronous upgrade operations on separate data blocks, the tool may reduce the impact to the availability or performance of a database due to data upgrades.

Thus, embodiments of the invention may operate while the system is "live," as asynchronous upgrade events are performed while the database is online. Doing so allows users to do work while the upgrade is in progress. Further, by splitting data records into blocks to be updated independently of one another, large upgrades can be processed in smaller chunks. Doing so allows the upgrade work to occur over time. Moreover, upgrades may be performed in parallel across multiple servers, minimizing the impact to online customer applications. Further still, upgrades may be performed transparently to users of the system. That is, upgrades are performed in the background with transitional logic in place to allow applications to work with either upgraded or un-upgraded data. Thus, system users need not be aware of these upgrade processes or be disrupted from using the system while an upgrade is in process.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., writable DVDs, RW-CDs, and hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Figure 1:
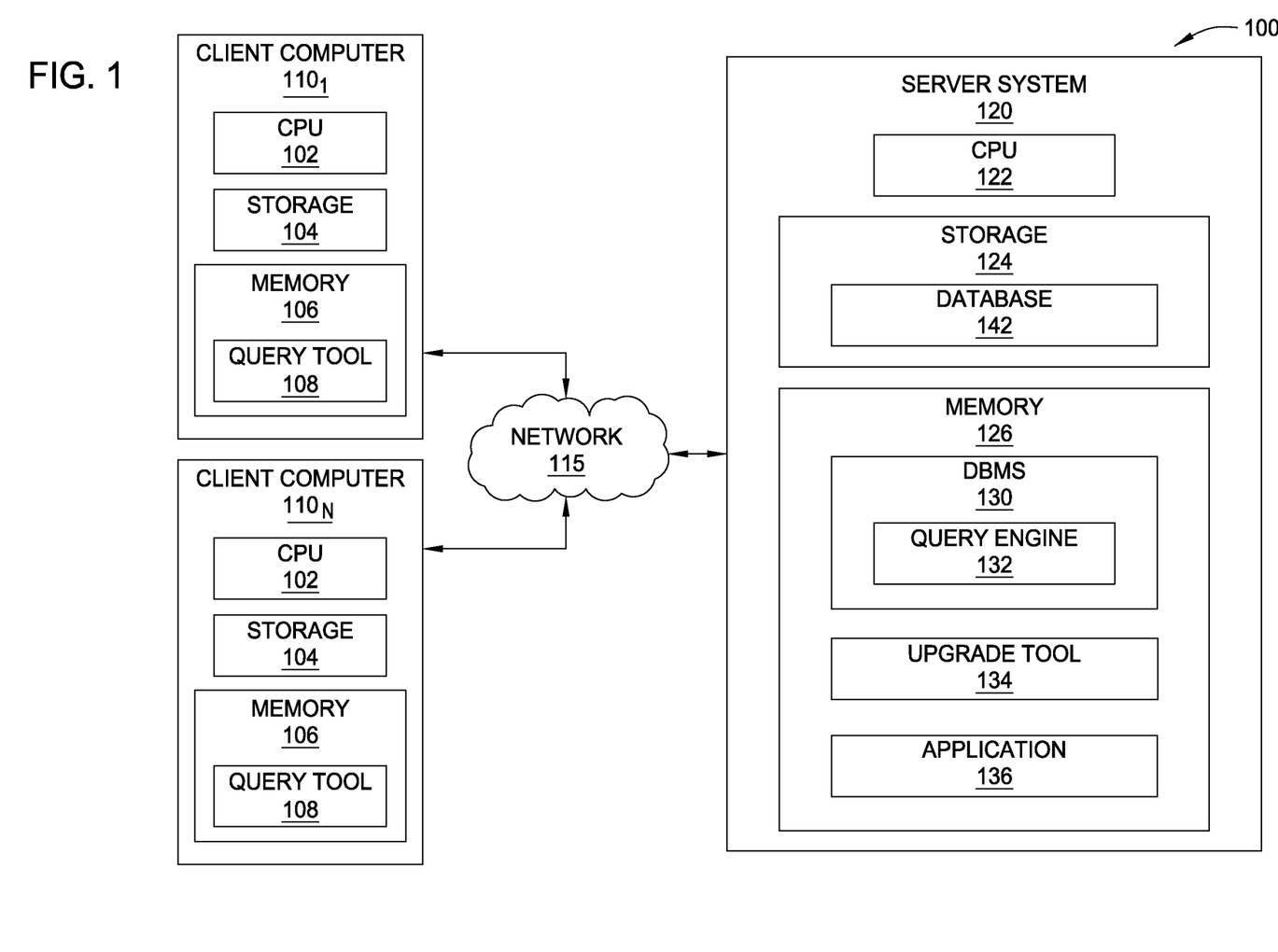
FIG. 1 illustrates an exemplary computing system, according to one embodiment of the invention.

FIG. 1 is a block diagram that illustrates a client server view of a computing environment 100, according to one embodiment of the invention. As shown, computing environment 100 includes client computers $110_{1-N}$, network 115 and server system 120. In one embodiment, the computer systems illustrated in environment 100 may include existing computer systems, e.g., desktop computers, server computers, laptop computers, tablet computers, and the like. The computing environment 100 illustrated in FIG. 1, however, is merely an example of one computing environment. Embodiments of the present invention may be implemented using other environments, regardless of whether the computer systems are complex multi-user computing systems, such as a cluster of individual computers connected by a high-speed network, single-user workstations, or network appliances lacking non-volatile storage. Further, the software applications illustrated in FIG. 1 and described herein may be implemented using computer software applications executing on existing computer systems, e.g., desktop computers, server computers, laptop computers, tablet computers, and the like. However, the software applications described herein are not limited to any currently existing computing environment or programming language, and may be adapted to take advantage of new computing systems as they become available.

As shown, each client computer 110 includes a central processing unit (CPU) 102, which obtains instructions and data from storage 104 and memory 106. CPU 102 is a programmable logic device that performs all the instruction, logic, and mathematical processing in a computer. Storage 104 stores application programs and data for use by client computer 110. Storage 104 may include hard-disk drives, flash memory devices, optical media and the like. Client computer 110 is operably connected to the network 115. Memory 106 may include an operating system (OS) for managing the operation of the client computer 110. Examples of an OS include UNIX, a version of the Microsoft Windows® operating system, and distributions of the Linux® operating system. (Note, Linux is a trademark of Linus Torvalds in the United States and other countries.)

As shown, memory 106 includes a query tool 108. In one embodiment, query tool 108 is software application that allows end users to access information stored in a database (e.g., database 142). Accordingly, query tool 108 may allow users to compose and submit a query to a database system, which, in response, may be configured to process the query and return a set of query results. Query tool 108 may be configured to compose queries in a database query language, such as Structured Query Language (SQL). However, it should be noted that query tool 108 is only shown by way of example; any suitable requesting entity may submit a query (e.g., another application, an operating system, etc). In one embodiment, the query tool 108 is used by a user application (e.g., a word processor) to request access to documents stored in a database 142. Similarly, query tool 108 may be a component of an application server (not shown) configured to retrieve data from database 142, process such data, and return a fully formed webpage to web server application, which in turn provides it to a requesting client.

Also as shown, server system 120 includes a CPU 122, which obtains instructions and data from memory 126 and storage 124. CPU 122 could be any processor adapted to support the methods of the invention. Memory 126 is any physical memory device sufficiently large to hold the necessary programs and data structures. Memory 126 could be one or a combination of memory devices, including Random Access Memory, nonvolatile, (e.g., programmable or flash memories, read-only memories, etc). Server system 120 may be operably connected to the network 115, which generally represents any kind of data communications network. Accordingly, the network 115 may represent both local and wide area networks, including the Internet.

Illustratively, storage 124 includes a database 142, which may be, for example, the DB2 relational database provided by IBM Corp. Database 142 is controlled by a database management system (DBMS) 130 included in memory 126. Also included in memory 126 is an application 136, representing a server application that interacts with data included in database 142. For example, application 136 may be a content engine that responds to user requests for documents, web pages, or other information stored in database 142. In one embodiment, DBMS 130 includes a query engine 132 and an upgrade tool 134. Query engine 132 may be configured to process data requests from applications (e.g., application 136, query tool 108, etc.), and to return data to the requesting application.

In one embodiment, upgrade tool 134 may be configured to perform asynchronous upgrades of data records included in database 142. That is, upgrade tool 134 enables data included in database 142 to be upgraded when there is available processing capacity in server system 120, thus reducing or eliminating impact to the availability and performance of DBMS 130 due to data upgrades. As shown, upgrade tool 134 is represented as a separate competent from application 136. However, in another embodiment, application 136 could incorporate upgrade tool 134 as part of the functionality provided by application 136.

Further, upgrade tool 134 may be configured to perform various types of upgrade operations. Each type of upgrade operation may involve a different modification to the data records. For example, one upgrade operation may be used to encrypt data, another upgrade operation may alter HTML tags embedded in web pages, yet another upgrade operation may convert a data type of a data record, and the like. Of course, one of ordinary skill in the art will readily recognize that the particular upgrade operations may be tailored to suit the needs of a particular case. In one embodiment, a group of upgrade operations may be specified for a collection of data records accessed by a given application, e.g., a word processor. Further, the group of upgrade operations may be performed serially, i.e., one after the other according to a specific sequence, or may be performed independently of one another, i.e., in parallel.

Additionally, each type of upgrade operation may have a corresponding upgrade status flag, meaning a data field or variable configured to indicate whether the upgrade operation has been completed for the data records of database 142 to which a given group of upgrade operations is to be supplied, (e.g., all of the records used to store word processing documents). Initially, the upgrade status flag may be set to indicate an incomplete status. Once all records have been upgraded, the upgrade status flag may be set to indicate a complete status. Note, the upgrade status flag for each upgrade operation may be set independently from the status flag for other upgrade status flags.

In one embodiment, upgrade tool 134 may be configured to use the upgrade status flag to determine whether a given upgrade operation has been completed for a collection of data records, and are thus available for access by a given application 136. For example, in one embodiment, a bitmask may be used where each type of asynchronous upgrade holds a different bit position in the bitmask. If a given bit is one, it may represent the upgrade work for that type of operation is incomplete. If zero, the work is completed (or vice versa). For data records of a new application as well as for data records of an upgraded application, this field should be zero, i.e., each bit of the bitmask should be set to zero or "completed." In an un-upgraded server, this field should contain bits set to one for each upgrade task that needs to be performed. In such a case, the upgrade tool may be configured to set each bit of the bitmask to zero as each upgrade task is completed. Alternatively, the application 136 may include transitional logic to enable users to access either original or upgraded data records, depending on the requirements of a requesting application.

In one embodiment, upgrade tool 134 may be configured to split data records of database 142 into data blocks. More specifically, the data records may be sorted (if required), and then split into blocks of a preferred size. The size of the data blocks may be predetermined based on characteristics of CPU 122, memory 126, etc., so as to enable efficient processing of asynchronous upgrade operations. For example, the block size may be configured to create data blocks of records for upgrade of a size that allows a given block to be processed without significantly disrupting access to the database 130. Similarly, data blocks may represent records for which one of a given set of upgrade operations needs to be performed.

Additionally, upgrade tool 134 may be configured to queue a data block for an upgrade operation. For example, upgrade tool 134 may add the upgrade operation to an asynchronous queue included in server system 120. Upgrade tool 134 may be further configured to determine the availability of processing capacity for performing the upgrade operation. The availability of processing capacity may be determined, for example, by analyzing a current demand load on CPU 122 and/or DBMS 130. Upgrade tool 134 may be further configured to set a continuation key, meaning a data field or variable used to identify the next data block to be upgraded. That is, the continuation key may represent a current upgrade state at any point during the overall record upgrade process and may reference the last object processed. In such a case, the next data block processed by the upgrade tool 134 starts off after the last block processed. This works even if chunks spread across multiple tables with different types of objects. The continuation key may be set at the time that a first data block is queued.

Of course, the above description of upgrade tool 134 is provided for illustrative purposes, and is not intended to be limiting of the scope of the invention. Other embodiments are also contemplated. In one example, functionality described above as part of upgrade tool 134 may be implemented as separate components working as a system.

Figure 2:
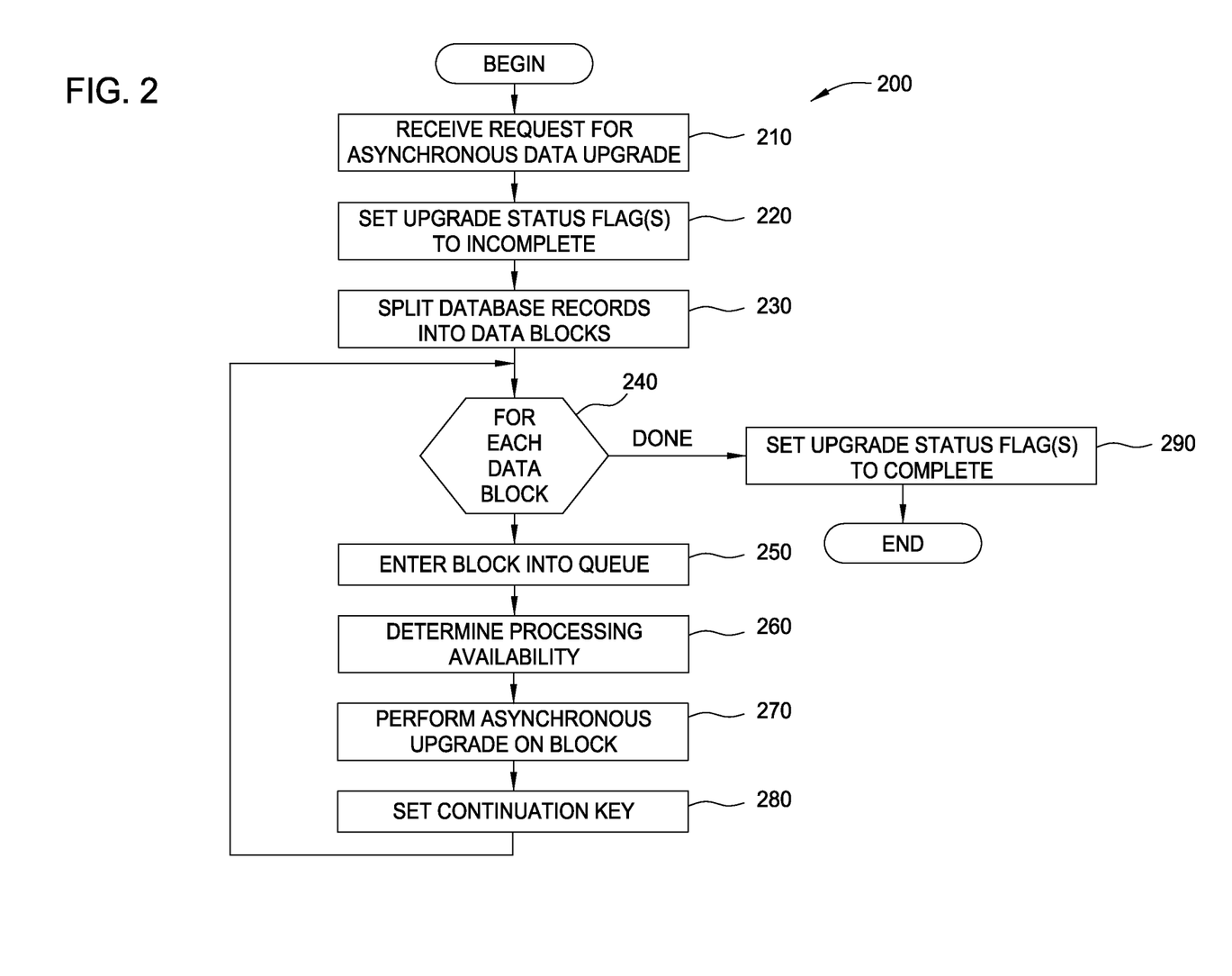
FIG. 2 illustrates a method for performing an asynchronous upgrade of database records, according to one embodiment of the invention.

FIG. 2 illustrates a method 200 for performing an asynchronous upgrade of database records, according to one embodiment of the invention. Persons skilled in the art will understand that, even though the method is described in conjunction with the system of FIG. 1, any system configured to perform the steps of method 200, in any order, is within the scope of the present invention.

As shown, method 200 begins at step 210, where a request for an asynchronous data upgrade is received. The received request may specify a particular type of upgrade operation to be performed. For example, a user may interact with upgrade tool 134 to request an asynchronous upgrade for the encryption of data records stored in database 142. The upgrade may be requested, for example, in response to application 136 being modified to interact with encrypted data records. Further, the request may specify multiple types of upgrade operations.

At step 220, an upgrade status flag may be set to indicate an incomplete status for the requested upgrade operation. For example, an upgrade status flag may be set to indicate that requested encryption upgrade operation has not been completed. Optionally, multiple upgrade status flags may be set to incomplete status, where each flag corresponds to a different type of upgrade operation.

Figure 3A:
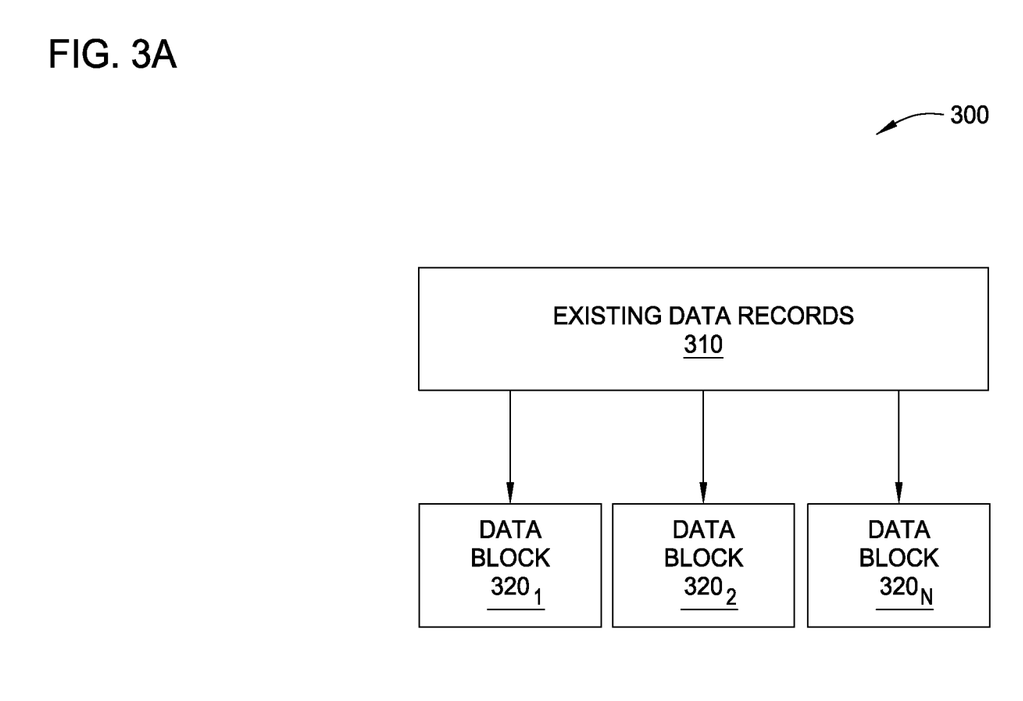
FIGS. 3A-3D provide illustrations of a method for upgrading a plurality of database records, according to one embodiment of the invention.

At step 230, the data records to be upgraded may be split into data blocks. For example, upgrade tool 134 may be configured to split data records of database 142 into data blocks. In one embodiment, the data records may first be sorted according to a key column, and may then be divided into blocks of a preferred size. For the sake of explanation, FIG. 3A provides a conceptual illustration 300 of step 230, according to one embodiment. As shown, existing data records 330 are split into data blocks $320_1$-$320_N$. Note that, illustratively, the size of data blocks $320_1$-$320_N$, if combined, is equal to the size of existing data records 330.

Referring again to FIG. 2, at step 240, the method 200 enters a loop (defined by steps 240, 250, 260, 270 and 280) for processing each data block created at step 230. At step 250, the data block is entered in a queue in order to be upgraded. For example, the data block may be queued in an asynchronous queue included in memory 126. At step 260, the availability of processing capacity for the upgrade operation may be determined. In one embodiment, as resources become available (e.g., process threads) a data block may selected and processed. In other embodiments, available processing capacity may be determined, for example, by analyzing a current demand load on CPU 122.

Figure 3B:
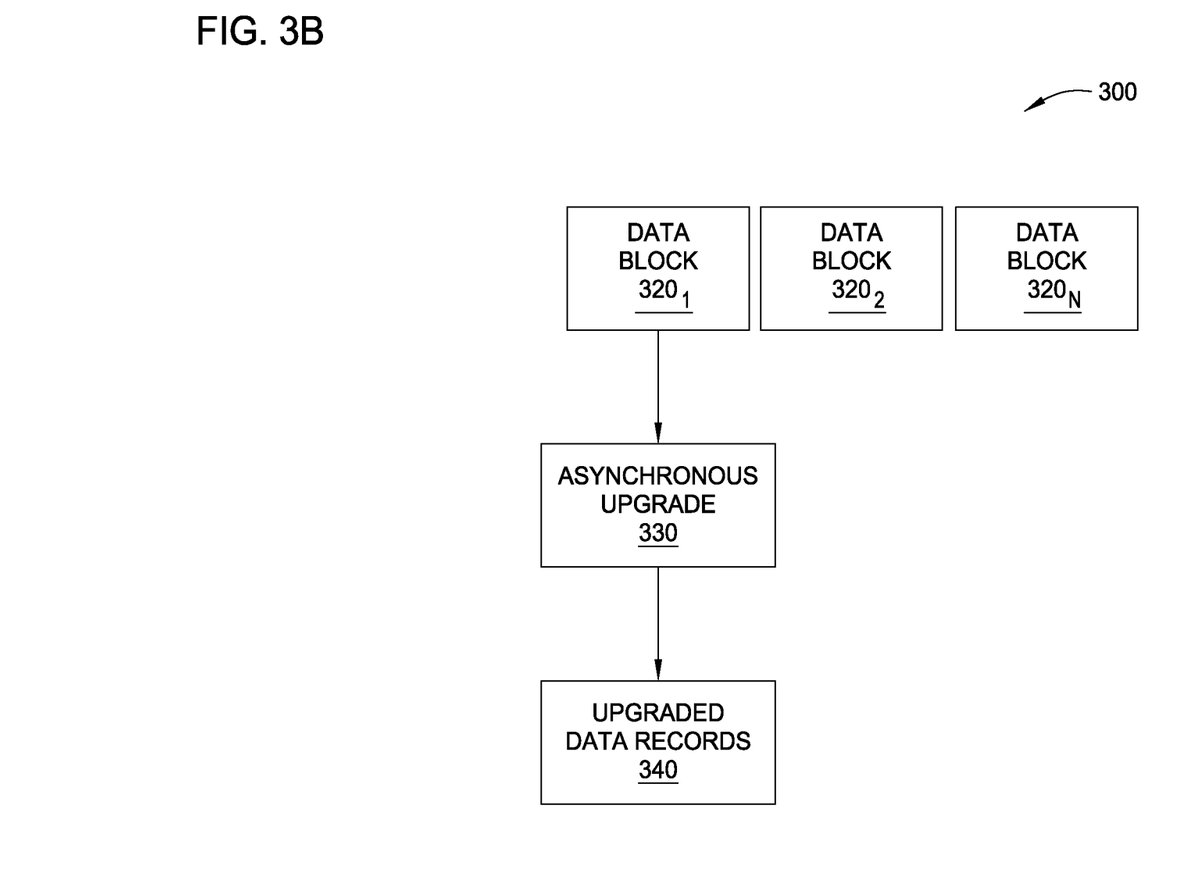

Once processing capacity is determined at step 260, then at step 270, the asynchronous upgrade operation may be performed on the current data block. For example, as shown in FIG. 3B, the data block $320_1$ may undergo an asynchronous upgrade 330, thus producing the upgraded data records 340. Asynchronous upgrade 330 may represent, e.g., an encryption of the data records included in data block $320_1$.

Figure 3C:
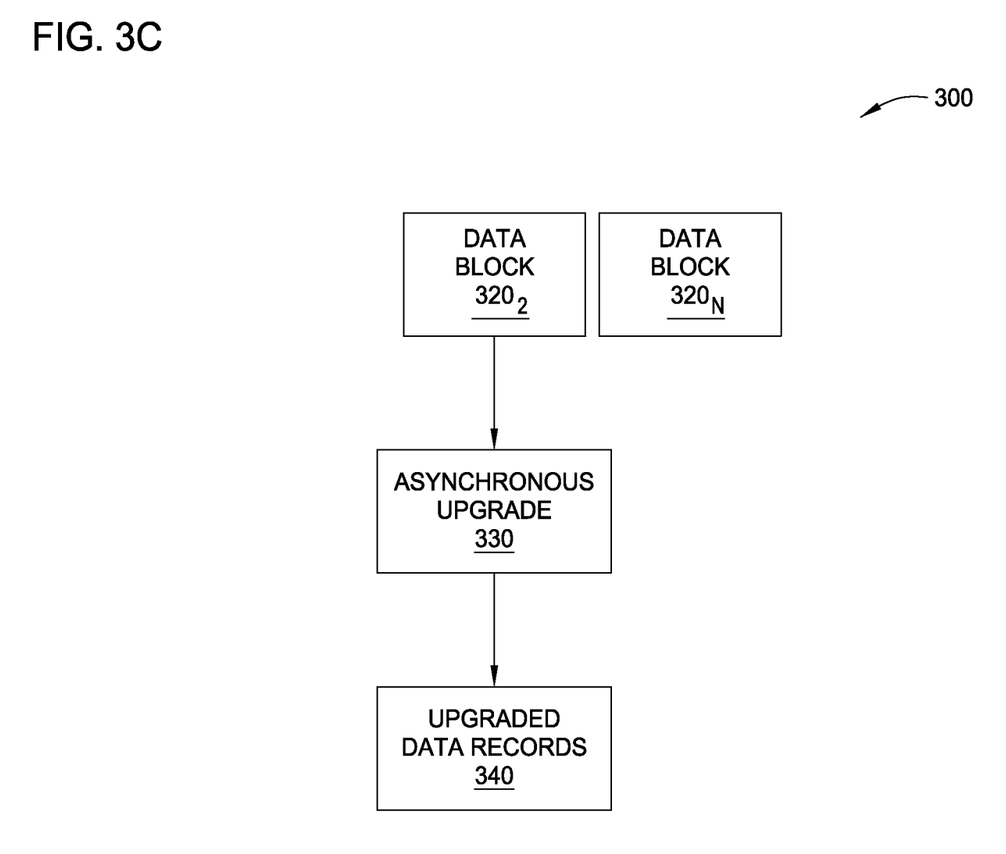
Figure 3D:
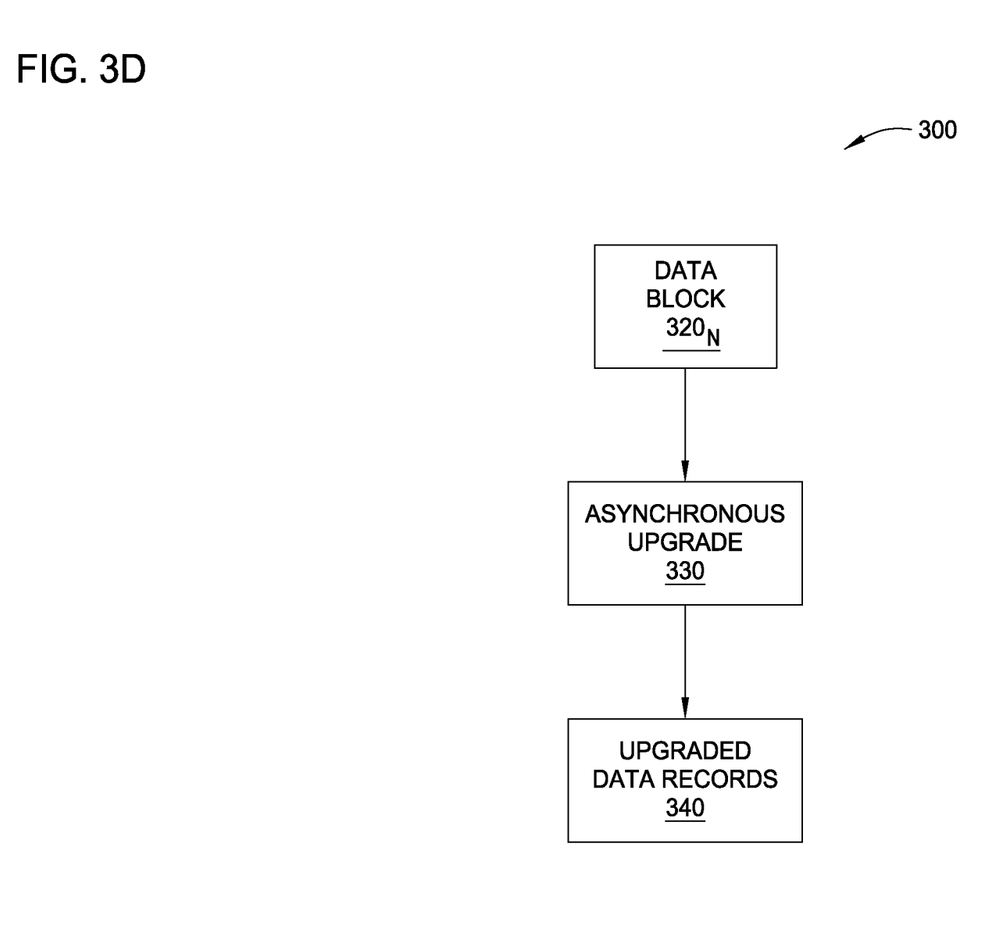

Referring again to FIG. 2, at step 280, a continuation key may be set to identify the next data block to be upgraded. For example, the continuation key may be set to identify the data block $320_2$ as the next data block to be upgraded. Thus, the identified block may be processed in the next loop through steps 240-280. Once all data blocks are completed at step 240, the upgrade operation is complete. By way of example, FIGS. 3C-3D illustrate data blocks $320_2$-$320_N$ undergoing asynchronous upgrade 330, and being added to the upgraded data records 340.

Referring again to FIG. 2, at step 290, the upgrade status flag may be set to indicate a complete status for the requested upgrade operation. In one embodiment, DBMS 130 may be configured to use the upgrade status flag indicating a complete status to enable application 136 to access the upgraded data records 340. After step 290, the method 200 terminates. As described, the method 200 may be used to upgrade data records for use with a new version of a software application while a system is "live." That is, an asynchronous upgrade operation may be performed while the database is online.

Advantageously, the asynchronous upgrade process described herein allows users to continue to access a system while the upgrade is in progress. Further, by splitting data records into blocks to be updated independently of one another, large upgrades can be processed in smaller chunks. In particular, chunks may be processed during periods of low overall system activity. Doing so allows the upgrade work to occur over in a manner that minimizes impact to users of the system. Further still, upgrades may be performed transparently to users of the system. That is, upgrades are performed in the background with transitional logic in place to allow applications to work with either upgraded or un-upgraded data. Thus, system users need not be aware of these upgrade processes or be disrupted from using the system while an upgrade is in process.

While the foregoing is directed to embodiments of the present invention, other and further embodiments of the invention may be devised without departing from the basic scope thereof, and the scope thereof is determined by the claims that follow.

What is claimed is:

1. A computer-implemented method comprising:
adding a plurality of data blocks to an asynchronous upgrade queue, wherein each data block references a set of database records, of a plurality of database records in a database;
determining, based on at least one of processor availability and process thread availability, that resources are available to upgrade one or more data blocks of the plurality of data blocks;
upgrading, by an upgrade tool separate from a software application, and asynchronously with other operations accessing the plurality of database records via a transitional logic, a data block selected from the asynchronous upgrade queue based on a continuation key, wherein upgrading the selected data block converts the set of database records referenced in the selected data block from a first format used by an older version of the software application to a second format used by a newer version of the software application; and
setting the continuation key to identify a next data block to be upgraded.

2. The computer-implemented method of claim 1, further comprising setting an upgrade status flag to indicate an incomplete status for an upgrade operation comprising the upgrading.

3. The computer-implemented method of claim 1, wherein the upgrading comprises an upgrade operation that is selected from one or more defined types of upgrade operations, wherein each of the one or more defined types of upgrade operations comprises a different modification of a database record according to at least one requirement of the software application.

4. The computer-implemented method of claim 1, wherein the plurality of database operations is caused by a given application.

5. The computer-implemented method of claim 1, wherein the upgrade tool and older and newer versions are operatively connected to the database, wherein the continuation key initially identifies the selected data block to be upgraded, wherein the other operations are enabled to access the first format and the second format of the plurality of database records via the transitional logic.

6. The computer-implemented method of claim 5, wherein the upgrade operation comprises at least one of a data encryption operation, a tag alteration operation for a webpage represented in a predefined markup language, and a data record type conversion operation;
wherein the first format comprises an unencrypted format, wherein the second format comprises an encrypted format, wherein each of the plurality of data blocks is upgradable sequentially with one another and also upgradable in parallel with one another, wherein each data block is upgraded without taking the database offline, wherein the computer-implemented method further comprises:
prior to generating the plurality of data blocks, determining a size of data blocks to generate, based on one or more hardware properties, wherein the one or more hardware properties include at least one processor property and at least one memory property.

7. The computer-implemented method of claim 6, wherein the computer-implemented method further comprises:
receiving a selection of an upgrade operation to perform on the plurality of database records, wherein the upgrade operation is selected from a plurality of distinct, predefined upgrade operations available for selection, the upgrade operation comprising the upgrading;
prior to adding the plurality of data blocks to the asynchronous upgrade queue, generating the plurality of data blocks by splitting the plurality of database records, wherein each of the plurality of data blocks is of the determined size; and
while any data blocks remain in the asynchronous upgrade queue:
determining whether resources are available to process a subsequent data block in the asynchronous upgrade queue; and
upon determining that any data block remains in the asynchronous upgrade queue, setting the continuation key to identify, in the asynchronous update queue, the subsequent data block to be upgraded.

8. The computer-implemented method of claim 7, wherein the database is further operatively connected to a query tool, wherein the plurality of database operations are caused by a given application, wherein each of the upgrade tool, the query tool, the software application, and the given application comprises a distinct application, wherein the comparing, selecting, upgrading, and setting are repeated as long as any data block remains in the asynchronous upgrade queue;
wherein the upgrade tool is executed by a first one or more computer processors, wherein the processor availability characterizes a second one or more computer processors executing the database;
wherein the older and newer versions, the upgrade and query tools, and the database are operatively connected via a network, wherein the database is managed by a database management system.

9. The computer-implemented method of claim 8, wherein each upgrade operation has a respective upgrade status flag, wherein each upgrade status flag comprises a respective bit position or a predefined bitmask;
wherein each of the plurality of defined upgrade operations comprises a different modification of a database record according to at least one requirement of a respective application used to access the plurality of database records;
wherein the upgrade operation comprises the data encryption operation, the tag alteration operation, and the data record type conversion operation.

10. The computer-implemented method of claim 9, further comprising:
prior to generating the plurality of data blocks, setting an upgrade status flag to indicate an incomplete status for the upgrade operation; and
upon completing the upgrade operation, setting the upgrade status flag to indicate a complete status for the upgrade operation, wherein the transitional logic uses the complete status to enable access to the upgraded data block;
wherein whether the resources are available is determined based on the processor availability and the process thread availability;

wherein the software application comprises a content engine that includes the transitional logic, wherein the content engine is included in a content management system.

11. The computer-implemented method of claim 1, wherein the other operations are enabled to access the first format and the second format of the plurality of database records via the transitional logic, wherein the computer-implemented method further comprises:
prior to generating the plurality of data blocks, setting an upgrade status flag to indicate an incomplete status for an upgrade operation comprising the upgrading; and
upon completing the upgrading, setting the upgrade status flag to indicate a complete status for the upgrading, wherein the transitional logic uses the complete status to enable access to the upgraded selected data block.

12. A non-transitory computer-readable medium containing an upgrade tool which, when executed, performs an operation comprising:
adding a plurality of data blocks to an asynchronous upgrade queue, wherein each data block references a set of database records, of a plurality of database records in a database;
determining, based on at least one of processor availability and process thread availability, that resources are available to upgrade one or more data blocks of the plurality of data blocks;
upgrading, by the upgrade tool and asynchronously with other operations accessing the plurality of database records via a transitional logic, the a data block selected from the asynchronous upgrade queue based on a continuation key, wherein upgrading the selected data block converts the set of database records referenced in the selected data block from a first format used by an older version of a software application to a second format used by a newer version of the software application, wherein the upgrade tool is separate from the software application; and
setting the continuation key to identify a next data block to be upgraded.

13. The non-transitory computer-readable medium of claim 12, wherein the operation further comprises setting an upgrade status flag to indicate an incomplete status for an upgrade operation comprising the upgrading.

14. The non-transitory computer-readable medium of claim 12, wherein the upgrading comprises an upgrade operation that is selected from one or more defined types of upgrade operations, wherein each of the one or more defined types of upgrade operations comprises a different modification of a database record according to at least one requirement of the software application.

15. The non-transitory computer-readable medium of claim 12, wherein the operation further comprises:
prior to generating the plurality of data blocks, setting an upgrade status flag to indicate an incomplete status for an upgrade operation comprising the upgrading; and
upon completing the upgrading, setting the upgrade status flag to indicate a complete status for the upgrading, wherein the transitional logic uses the complete status to enable access to the upgraded selected data block.

16. The non-transitory computer-readable medium of claim 12, wherein the plurality of database operations is caused by a given application.

17. A system comprising:
one or more computer processors; and
a memory containing an upgrade tool which, when executed by the one or more computer processors, performs an operation comprising:
adding a plurality of data blocks to an asynchronous upgrade queue, wherein each data block references a set of database records, of a plurality of database records in a database;
determining, based on at least one of processor availability and process thread availability, that resources are available to upgrade one or more data blocks of the plurality of data blocks;
upgrading, asynchronously with other operations accessing the plurality of database records via a transitional logic, a data block selected from the asynchronous upgrade queue based on a continuation key, wherein upgrading the selected data block converts the set of database records referenced in the selected data block from a first format used by an older version of a software application to a second format used by a newer version of the software application, wherein the upgrade tool is separate from the software application; and
setting the continuation key to identify a next data block to be upgraded.

18. The system of claim 17, wherein the operation further comprises setting an upgrade status flag to indicate an incomplete status for an upgrade operation comprising the upgrading.

19. The system of claim 17, wherein the upgrading comprises an upgrade operation that is selected from one or more defined types of upgrade operations, wherein each of the one or more defined types of upgrade operations comprises a different modification of a database record according to at least one requirement of the software application.

20. The system of claim 17, wherein the operation further comprises:
prior to generating the plurality of data blocks, setting an upgrade status flag to indicate an incomplete status for an upgrade operation comprising the upgrading; and
upon completing the upgrading, setting the upgrade status flag to indicate a complete status for the selected upgrading, wherein the transitional logic uses the complete status to enable access to the upgraded selected data block.

21. The system of claim 17, wherein the plurality of database operations is caused by a given application.

* * * * *